United States Patent Office 3,213,613
Patented Oct. 26, 1965

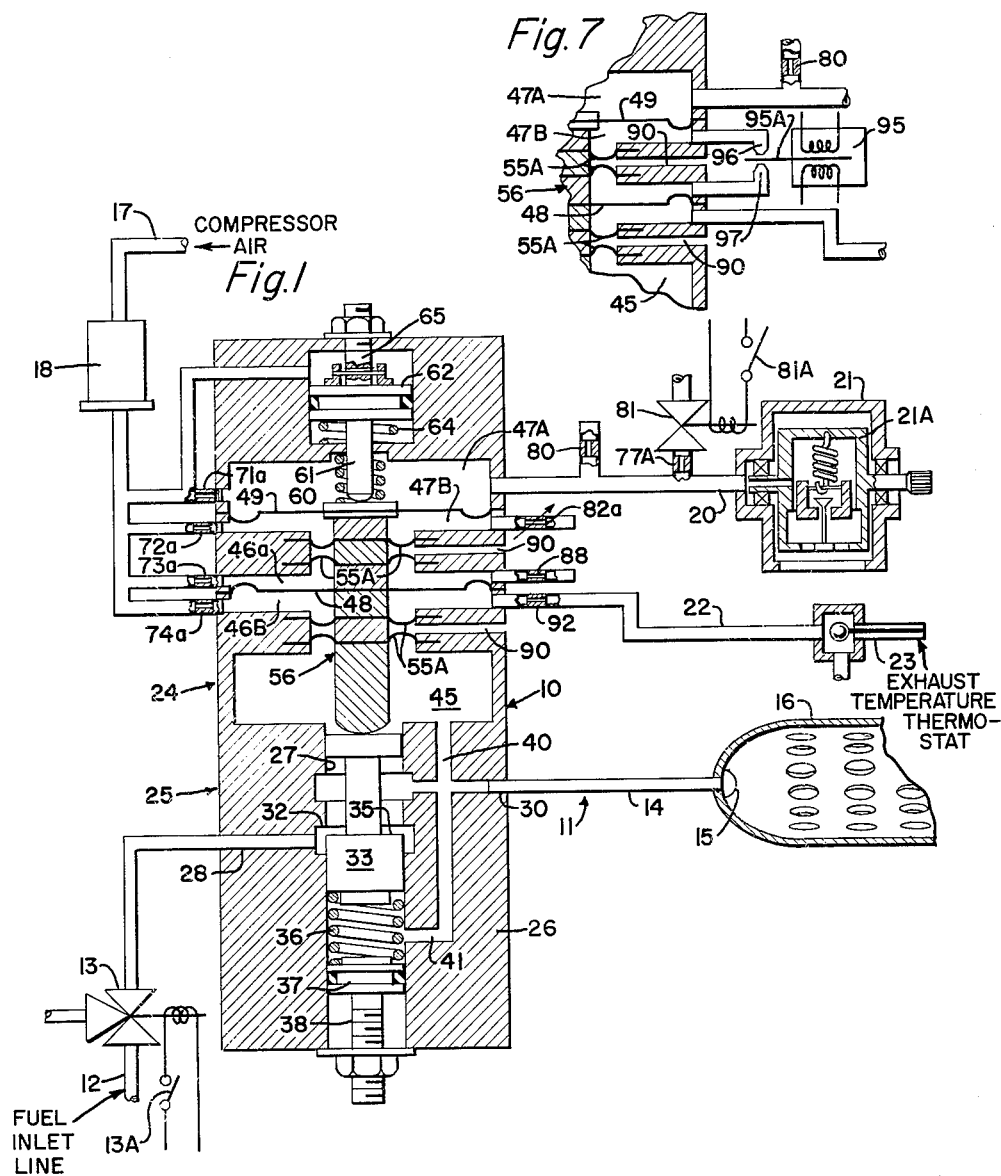

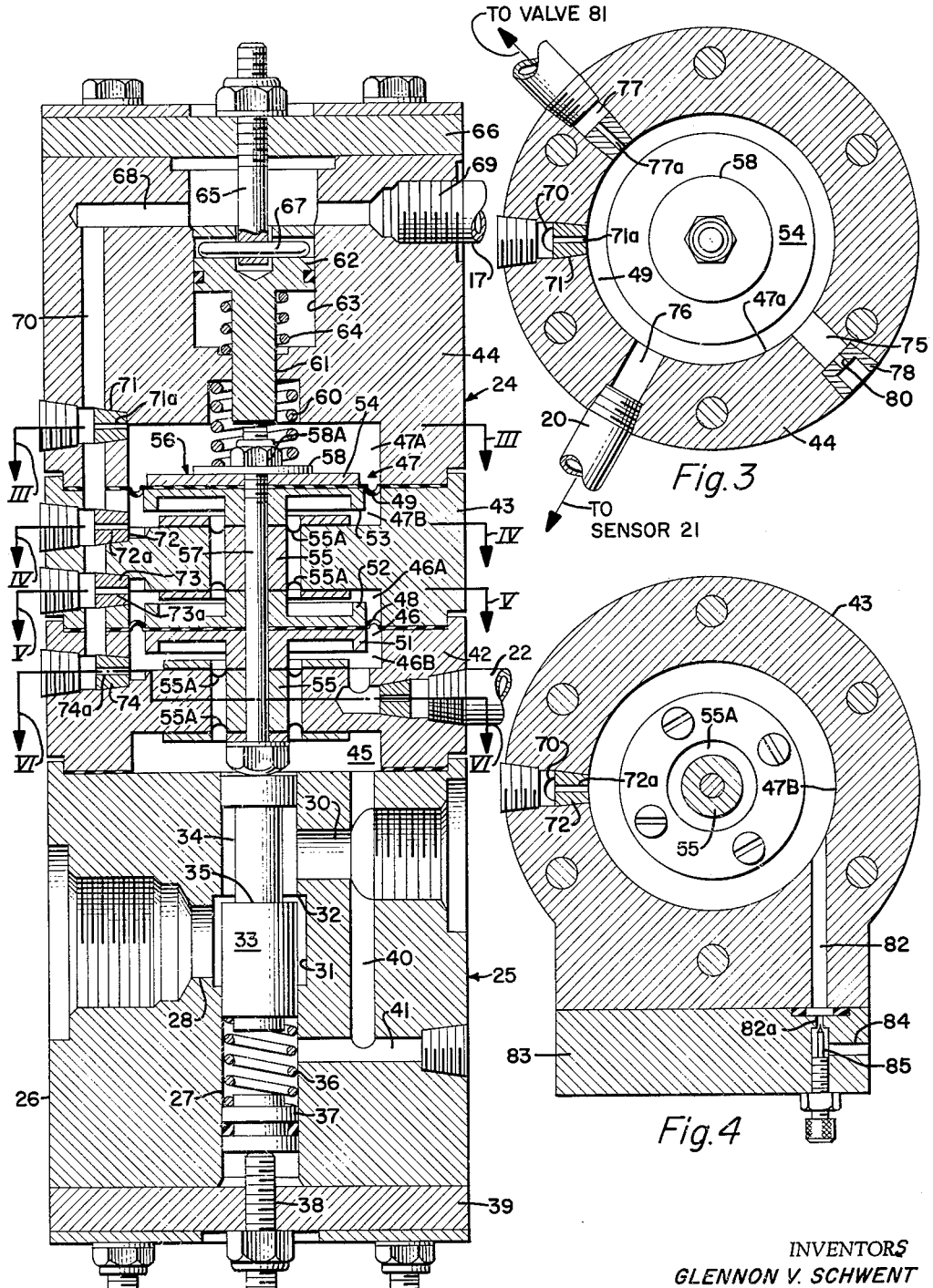

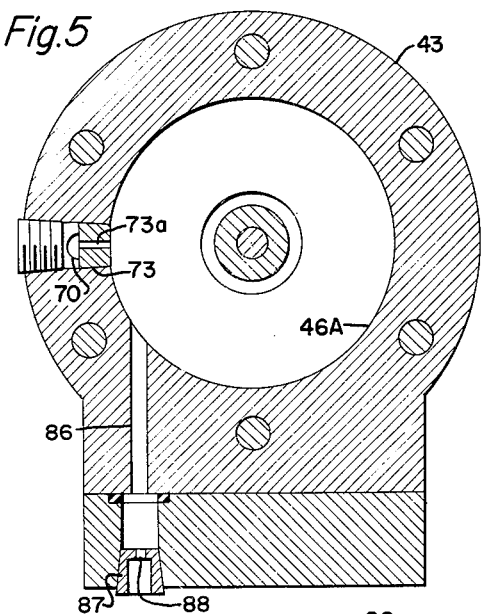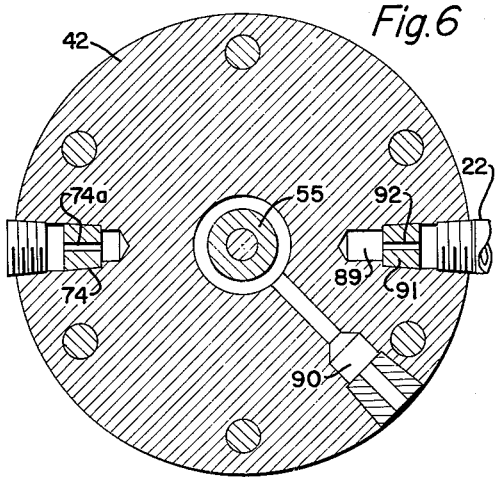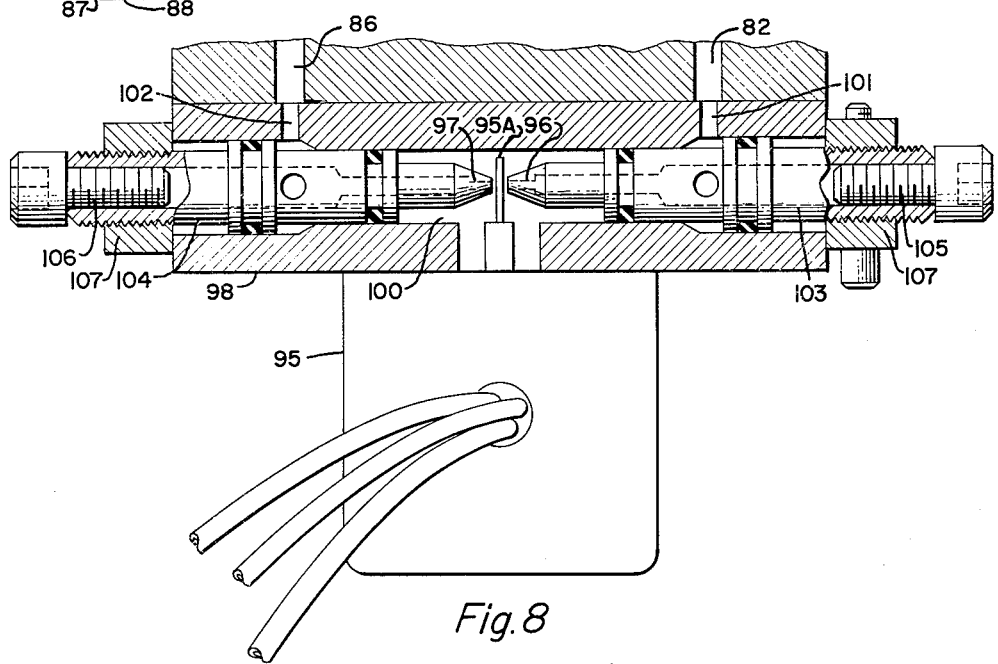

3,213,613
FUEL CONTROL MECHANISM FOR A GAS
TURBINE ENGINE
Glennon V. Schwent, Tempe, and Harvey W. Wright, Jr.,
Scottsdale, Ariz., assignors to The Garrett Corporation,
Los Angeles, Calif., a corporation of California
Filed Jan. 23, 1963, Ser. No. 253,358
12 Claims. (Cl. 60—39.28)

This invention relates generally to gas turbine engines, but is more particularly directed to a control system for governing the admission of gaseous fuel to a gas turbine engine.

In the operation of gas turbine engines, fuel is supplied to a combustor where it is mixed with compressed air and then burned to produce high temperature gases for driving the turbine. The fuel must be supplied to one or more fuel nozzles in the combustor of the engine under regulated pressure higher than that of the compressed air into which the fuel is injected. The volume of fuel must also be carefully regulated since different quantities are required at various phases of operation of the engine, a minimum (though quite tangible) amount being required during the starting phase and different quantities being necessary during acceleration, steady state, loading and unloading phases. Care must also be exercised to prevent overtemperature operation to prevent damage to the engine. In some instances, gas turbine engines are also employed to drive electrical current generators which must be operated at relatively precise speeds in order to maintain the current at required frequencies. It should be obvious that the rate of fuel admission at such times is very important.

An object of this invention is to provide a relatively simple fuel control mechanism and system of the droop type by which a gas turbine engine may be readily put through all of the phases of operation mentioned above with a minimum of error and without any unusual or extra attention by the operator.

A further object of the invention is to provide a fuel control mechanism which is substantially automatic in operation and which will admit a predetermined reduced quantity of fuel for the starting phase of the gas turbine engine, then vary the amount of fuel admitted thereafter as required by the engine in accordance with signals transmitted to the control mechanism by means responsive to engine operation.

It is also an object of this invention to provide a fuel control mechanism which will serve to regulate the fuel pressure supplied to the fuel nozzle so that the quantities of fuel admitted to the gas turbine engine combustor will be relatively unaffected by fluctuations in supply pressure at the inlet to the control mechanism.

Another object of this invention is to provide a fuel control mechanism having a plurality of chambers with movable walls, a number of orifices and springs all arrnged to utilize signals generated by the engine to modulate the flow of fuel to cause the engine to operate in the desired manner.

Still another object of the invention is to provide a fuel control mechanism having a plurality of chambers with diaphragms which present oppositely facing surfaces to fluid pressures, the latter being either selectively or automatically varied, in response to the tendency of engine operating conditions to change, to adjust the fuel flow whereby required engine operating conditions will be maintained or secured.

A further object of the invention is to provide a fuel control mechanism having a valve portion and an actuator portion, the latter including a diaphragm and plunger assembly which provides a plurality of oppositely facing surface areas to which controlled fluid pressures are applied to effect valve operation, the mechanism having orifice means for applying and varying fluid pressures on the diaphragm surface areas to motivate the actuator, predetermined orifice means being fixed and others being closed or open in response to turbine speed and temperature and to conditions of operation of apparatus driven by the gas turbine engine.

Another object of the invention is to provide a fuel control mechanism having a valve portion and an actuator portion and resilient means normally tending to move the valve portion into a position in which a predetermined fuel flow for starting may take place, the mechanism having a means for varying the valve position for starting fuel flow and limit means which, after engine operation has commenced, is automatically adjusted to provide a minimum fuel flow which will prevent flameout.

With the foregoing and other objects in mind, which will become apparent as the description progresses, the invention consists in the novel features of construction and arrangements of parts more particularly shown in the accompanying drawings and pointed out in the following specification.

In the drawings:

FIG. 1 is a schematic view of a fuel system of a gas turbine engine embodying the principles of the present invention;

FIG. 2 is an axial sectional view of a fuel control mechanism formed in accordance with the present invention and used in the system shown in FIG. 1;

FIGS. 3, 4, 5, and 6 are detailed horizontal sectional views taken on planes indicated by lines III—III, IV—IV, V—V, and VI—VI, respectively, of FIG. 2;

FIG. 7 is a schematic view of a portion of a slightly modified fuel system; and

FIG. 8 is a sectional view of an electroresponsive pressure varying mechanism employed in the modified fuel system shown in FIG. 7.

Referring more particularly to the drawings, a fuel control mechanism 10, formed in accordance with the present invention, is shown schematically in a fuel system 11 in FIG. 1. This fuel system includes a line 12 extending from a source of gaseous fuel under pressure. This line contains a solenoid valve 13 used as a master to initiate and interrupt fuel flow to the system. A fuel line 14 extends from the mechanism 10 to a nozzle 15 forming a part of a combustor 16 of a gas turbine engine (not shown). Another line 17 leads from the compressor (not shown) of the gas turbine engine to the mechanism 10, a suitable filter 18 being disposed in this line. The system also includes a line 20 leading from the mechanism 10 to a speed sensor 21 which may be of any suitable type, one example being that shown in the reissue Patent No. 25,120 to John K. Jackson, dated July 31, 1962. Another line 22 leads from the control mechanism to a thermostatic valve device 23 utilized as a safety means in the control of fuel flow, as will be pointed out more in detail hereinafter. A more detailed description of the system and its operation is as follows:

The control mechanism 10 is shown in detail in FIGS. 2 to 6, inclusive. As mentioned in the objects, this control mechanism includes an actuator section 24 and a valve section 25. These sections are composed of a plurality of substantially cylindrical pieces secured together to form the body of the unit. The valve section includes body portion 26 in which a central bore 27 is formed; inlet and outlet ports 28 and 30 communicate with this bore at points spaced longitudinally thereof. In registration with the inlet port 28, the bore is enlarged as at 31 to form a shoulder 32 which in effect functions as a valve seat. The bore receives, for sliding movement, a spool valve 33 having an external groove 34 which establishes communication, in certain positions of the spool, between the inlet and outlet ports 28 and 30. A shoulder 35, provided by the groove, cooperates with the shoulder 32 to control communication between the inlet and outlet ports. A coil spring 36 disposed in the bore 27 at the lower end of the spool, as viewed in FIG. 2, tends to move the spool toward a position in which shoulders 32 and 35 restrict the flow of fuel from the inlet to the outlet port. The force of spring 36 may be varied to change the engine starting flow through the adjustment of an abutment 37 by the manipulation of the screw 38 disposed in the bottom wall 39 of the valve section. The body 26 also has passage sections 40 and 41 formed therein to establish communication between the bore 27 at the lower end of the spool and the outlet port. The upper end of passage 40 also establishes communication between the outlet port and the upper end of the valve spool for purposes which will be set forth later.

The actuator section of the control mechanism includes body pieces 42, 43 and 44 which are shaped to provide a plurality of chambers 45, 46 and 47. Chamber 45 is disposed at the lower end of the actuator section and is in communication, via the upper end of passage section 40, with the fuel outlet port and the upper end of the bore 27. Fuel under outlet port pressure will be received by the chamber 45, such pressure being applied to the upper end of the valve spool 33. This pressure will be balanced by the same pressure applied, via passage sections 40 and 41, to the lower end of the valve spool. The actuator section of the control mechanism also includes an assembly of movable wall elements which in the present instance are composed of flexible diaphragms 48 and 49. These diaphragms are marginally clamped between sections 42 and 43, and 43 and 44, respectively. The intermediate portions of these diaphragms are clamped between disc elements 51 to 54, inclusive, these elements and spacers 55 cooperating with the diaphragms to form a movable actuating unit designated generally by the numeral 56. The disc elements have central projections conforming in diameter to the spacers 55 to provide the actuator with a center plunger through which a bolt or stem 57 extends. This bolt receives a washer 58 and nut 58A employed to retain the parts making up the actuator unit in assembled relationship.

The plunger of the unit extends through opening formed in body parts 42 and 43, these openings being provided with flexible seals 55A which are clamped at their central portions between the disc projections and spacers, and at their peripheries between the body parts and suitable retainers. These seals prevent the loss of pressure from the chambers around the plunger of the actuating unit. As will be obvious from an inspection of FIG. 2, the diaphragms 48 and 49 divide the chambers 46 and 47 in which they are positioned into pairs of chamber sections 46A and 46B and 47A and 47B, each of such sections having a movable wall formed by the respective diaphragm. It will be apparent that differential pressures existing in the chamber sections will be applied to the actuator unit to effect movement thereof. The head of bolt 57 engages the valve spool 33 so that movement of the actuator unit 56 in one direction will cause the valve spool 33 to move against the force of the spring 36, and movement in the other direction will permit the valve spool to be moved by such spring.

The actuator unit is biased toward the valve spool by a spring 60 disposed between the washer 58 and an inner wall of a counterbore formed in body portion 44. The forces of springs 60 and 36 are so calculated that the actuator unit and valve spool 33 will occupy a position of equilibrium, when the engine is not in operation, with the shoulders 32 and 35 spaced to provide the proper fuel flow to initiate engine operation. This position of the spool valve and consequently the quantity of fuel for starting may be varied through the adjustment of screw 38. The prevent spool 33 from moving far enough in a closing direction to cause a flameout after engine operation has been initiated, an adjustable stop element 61 has been provided. This element is mounted in the body portion 44 at the upper end of the control mechanism. The element 61 has a piston 62 at the upper end thereof, the piston 62 being received for movement in a piston chamber 63 and normally urged in an upward direction by a coil spring 64. Movement in this direction is limited by an adjusting screw 65 threaded into a top wall 66 provided on the upper end of the control mechanism. It will be noted that screw 65 is connected with piston 62 by a crosspin 67, the opening in piston 62 for this pin being slightly larger than the pin for a purpose to be hereinafter set forth.

The body portions 42, 43 and 44 have passages 68 and 70 formed therein. Passage 68 interects the piston chamber 63 and the outer portion of the passage 68 is threaded as at 69 for the reception of the line 17 which leads from the compressor. Passage 70 connects with the inner end of passage 68 and is intercepted at longtudinally spaced points by a plurality of bores. These bores receive plugs 71 to 74, inclusive, in which orifice ports 71a, 72a, 73a, and 74a are formed to establish restricted communication between the passage 70 and the chamber sections on opposite sides of diaphragms 48 and 49. It will be apparent that after gas turbine engine operation has been initiated, fluid under pressure from the compressor will be supplied through passages 68 and 70 to the chamber sections. This fluid will exert forces on the oppositely facing surface areas of the diaphragm assembly, and, if pressure differentials in the chamber sections exist, the diaphragm assembly will tend to move the spool valve in one direction or permit it to be moved in the other direction by the spring 36. The direction of movement of the spool valve will depend upon the chamber sections containing the higher pressure. The elements, such as the speed sensor 21, the thermostatic valve 23, and others to be mentioned which form parts of the control system, are provided to create pressure differential in the diaphragm chamber sections in response to conditions of engine operation to effect desired movement of the actuator and fuel valve controlled thereby.

To assist in effecting the operation of the system, the body portions 42, 43 and 44 have various openings or ports formed therein. Section 44, as illustrated in FIG. 3, contains ports 75, 76 and 77 in addition to the port which receives plug 71. Port 75 has a plug 78 disposed therein, this plug having an orifice 80 which establishes restricted communication between chamber section 47A and the atmosphere. Port 76 is connected by the line 20 with the speed sensor 21, this member having a rotatable speed responsive element 21A connected with the gas turbine engine and operated thereby to permit the escape of fluid under pressure from the chamber section 47A to the atmosphere in response to predetermined engine speed. Port 77 contains an orifice 77a and is connected by a duct with a valve 81 (see FIG. 1) which is electroresponsive to establish communication between the chamber section 47A and the atmosphere. This outlet is utilized during engine starting operations. A plurality of such valve controlled ports may be provided if desired to effect a particular fuel/speed pattern during start and acceleration to normal governed speed, the object being to prevent the admission of too much fuel and exceeding the safe temperature limits. When the electroresponsive valve 81 is open, fluid under pressure will be vented from the chamber section 47A and the actuator unit 56 will then be moved by spring 36 to the position in which the valve spool 33 will be disposed to effect the starting phase of engine operation.

FIG. 4 illustrates a port 82 communicating with chamber section 47B in addition to the orifice 72a in plug 72. Port 82 communicates with an orifice 82a formed in a plate 83 secured to the side of the control mechanism body. Plate 83 has an outlet 84 leading from this orifice to the atmosphere. The plate receives a needle valve 85 which is adjustable to vary the effective size of the orifice.

With this needle valve, communication between chamber section 47B and the atmosphere may be varied. The needle valve is useful for "trimming" or selecting the engine speed at which the speed sensor 21 becomes effective.

FIG. 5 illustrates another port 86 which is formed in body portion 43, this port establishing communication between the chamber section 46A and the atmosphere. Port 86 also contains a plug 87 in which an orifice 88 is provided to restrict such communication.

As illustrated in FIG. 6, body portion 42 has a plurality of ports 89 and 90 formed therein in addition to the port which receives plug 74. As previously pointed out, plug 74 has an orifice 74a through which fluid under pressure from the compressor is supplied to the chamber section 46B. Port 89 also receives a plug 91 with an orifice 92, this port being connected by line 22 with the thermostatic valve 23. This valve, or the thermostatic element thereof, is disposed in the exhaust gas outlet of the gas turbine engine. It is a normally open valve, but when the exhaust gases reach a predetermined temperature the valve will move toward a closed position to resist the flow of fluid through line 22 to the atmosphere. Orifices 92 and 74a are so constructed and sized that when valve 23 is open sonic flow will take place through orifices 92 and 74a and a reference pressure will be created in chamber 46B. This pressure will be applied to the underside of diaphragm 48 to offer a set resistance to movement of the diaphragm assembly in a valve opening direction. When the temperature of the exhaust gases approaches a certain value the vavle 23 will close sufficiently to reduce the flow through orifice 92 to subsonic and the pressure will increase in the chamber section 46B, such pressure being applied to the diaphragm assembly to cause it to move the valve spool toward closed position to decrease the amount of fuel flowing to the engine with a consequent decrease in turbine exhaust gas temperature. The thermostatic valve thus constitutes a safety device to prevent overtemperature operation.

Port 90 merely constitutes an outlet to the atmosphere from the space between seals 55A at the upper and lower ends of the spacer 55 at the lower end of the diaphragm assembly. A similar outlet is also provided from the space between seals 55A at the ends of the other spacer 55. The sizes of the orifices, for admitting fluid under pressure to the chamber sections and for controlling the escape of fluid under pressure therefrom, are selected to create pressures required in the chamber sections 46A, 46B, 47A, and 47B at the times necessary to effect the desired operations of the engine.

The operation of the fuel control mechanism may be summarized as follows, particular reference being made to the schematic of FIG. 1. Valve 13 is opened by closing switch 13A. When the valve 13 is opened, gaseous fuel under pressure will be admitted to the valve. At this time the valve spool will be in the position shown in FIGS. 1 and 2 wherein a minimum of gas for the starting operation is admitted. This gas will flow through the valve and through line 14 to the nozzle of the combustor. Some of the gas under pressure will also flow through passage branches 40 and 41 to the top and bottom ends of the valve spool. Springs 36 and 60 will at this time hold the valve spool in this position. When switch 13A is closed, switch 81A for valve 81 is also closed, valve 81 serving to open orifice 77A to the atmosphere. When valve 81 is opened, chamber 47A will be vented to the atmosphere and the pressure of fuel in chamber 45 will be applied to the actuator assembly through lower diaphragm 55A to urge this assembly in an upward direction, this force supplementing the force of spring 36.

After the engine operation has been initiated and normal governed speed has been attained, switch 81A will be opened to permit valve 81 to close. Prior to the initiation of operation of the engine and until a substantial speed of operation has been attained, the compressor output pressure will have relatively no effect on the control mechanism. During this time, spring 64 will hold piston 62 and stop 61 in an elevated position, determined by the setting of screw 65 and the looseness of pin 67 in the hole in piston 62, where it will offer no opposition to the movement of the valve actuator. When the engine speed increases sufficiently to cause the compressor to develop pressure, fluid will be applied through line 17 to the control mechanism. At this time, pressure applied to piston 62 will move it and stop 61 downwardly to a position in which the actuator will be prevented from moving upwardly far enough to permit the valve to reduce fuel flow below a level which could cause a flameout. Fluid under pressure supplied to the control mechanism will flow through orifices 71a, 72a, 73a, and 74a to the chamber sections communicating therewith.

The control system is substantially automatic in operation. The air under pressure from the compressor received by the chamber sections 47A and 47B, and 46A and 46B, will be applied to the diaphragms 48 and 49. It will be obvious that these diaphragms provide surface areas facing in opposite directions, the total pressures on such areas opposing one another. If the total pressure applied to the upwardly facing areas exceeds that on the other areas, there will be a tendency for the actuator to move in a downward direction and increase the opening of the fuel valve. To control the pressures in the chamber sections, use is made of the speed sensor 21, the variable orifice 82a, and the thermostatic valve 23. As previously pointed out, valve 23 is normally open. This valve only comes into use when an overtemperature condition tends to occur in the turbine exhaust gas outlet.

As the turbine engine speed increases, the rate of rotation of element 21A of the sensor 21 also increases. When a predetermined speed has been reached, a member in element 21A responding to centrifugal force will open a valve and permit fluid under pressure to bleed from the chamber section 47A. As this pressure tends to reduce, spring 36 and other upwardly directed forces will tend to move the valve and actuator toward a valve closing position to reduce the amount of fuel admitted.

It will be obvious that an equilibrium position will be reached wherein the engine operates at a speed which will permit just sufficient fluid under pressure to escape from chamber section 47A to maintain the equilibrium position. The speed may be varied or selected through the adjustment of the variable orifice 82a. When this orifice is adjusted the pressure in chamber 47B will be varied, this pressure tending to oppose the pressure in chamber 47A. When pressure in chamber 47B increases there will be a tendency for the actuator and valve spool to move upwardly and decrease fuel which will in turn decrease the engine speed. Since the valve in the speed sensor responds to centrifugal force, it will tend to close and restrict fluid flow through line 20. The pressure in chamber 47A will then increase to establish a new equilibrium position. Adjustment of orifice 82a to cause a reduction of pressure in chamber 47B will produce an opposite result.

In the event the gas turbine engine is unduly loaded and its speed decreased, the pressure in chamber 47A will tend to increase, causing valve 33 to move toward an open position. More fuel will then be admitted to tend to cause the gas turbine engine speed to increase. Due to the admission of additional fuel, an increase will occur in the temperature of the exhaust gases and thermostatic valve 23 will then be moved toward a closed position to reduce the amount of fluid flowing to the atmosphere from chamber section 46B. The pressure in this chamber will then increase to apply a force tending to move the actuator assembly in an upward direction. As a result, valve 33 will move toward a closed position in response to such movement to reduce the fuel flow to the engine.

In should be obvious from the foregoing that under normal conditions the control system will operate substantially automatically, with no attention by the operator.

A modified system has been schematically illustrated in FIG. 7. This modified system substitutes an electrical control, shown more in detail in FIG. 8, for the orifices 82a and 88. This electrical control comprises a torque motor 95 having an armature 95A disposed between a pair of jet outlet nozzles 96 and 97. These nozzles are received in a block 98 which replaces plate 83 of the form of the invention first described. Block 98 has a bore 100 formed therein and ports 101 and 102 connect this bore with passages 82 and 86, respectively, leading from chamber sections 47B and 46A. The nozzles 96 and 97 are disposed in opposite ends of the bore 100; they comprise substantially tubular elements 103 and 104 with internal passages reduced at their inner ends to form the nozzle outlets. The internal passages communicate through lateral ports with the passages 82 and 86. The outer ends of the internal passages are threaded to receive screws 105 and 106 which are sealed in place to close the outer ends of the passages. Elements 103 and 104 are externally threaded at their outer ends for reception by split clamps 107 suitably secured to the ends of block 98. The nozzles may be adjusted toward or away from the armature 95A by loosing the clamping screws, threading the elements in or out as required and tightening the clamping screws. Jet outlet nozzle 96 is substituted for the orifice 82a, while jet outlet nozzle 97 replaces orifice 88. A suitable electric signal generator (not shown) may be provided to effect the energization of the torque motor to cause the armature 95A to move toward the selected jet outlet nozzle. When the armature moves toward either nozzle, the fluid flow from the chamber section communimating with such nozzle will be obstructed and the pressure in such chamber section will be increased. This increase in pressure will tend to move the actuator assembly in the respective direction, causing a resulting increase or decrease in the volume of fuel admitted to the fuel nozzle. The speed of the gas turbine engine will thus be increased or decreased accordingly. The electric signal generator for the torque motor may be controlled automatically by an accessory connected for operation by the gas turbine engine.

We claim:
1. A fuel control system for a gas turbine engine having a compressor and a combustor with a fuel nozzle, comprising:
   (a) means forming a body with a valve portion and an actuator portion, said valve portion having a bore with spaced fuel inlet and outlet ports, the inlet port being adapted for connection with a pressurized fuel source and the outlet being adapted for connection with the fuel nozzle of the gas turbine;
   (b) valve means in said bore for controlling communication between said inlet and outlet ports;
   (c) means normally tending to move said valve toward a closed position;
   (d) valve actuating means in said actuator portion including a plunger and movable wall assembly, said assembly having first and second opposed wall surfaces adapted to be exposed to differential compressor outlet pressures, the higher pressure being applied to the first wall surface and tending to cause said actuating means to open said valve;
   (e) means responsive to the speed of the gas turbine engine to controllably vent and thus limit the pressure applied to said first wall surface; and
   (f) means responsive to a predetermined increase in turbine operating temperature to increase the pressure applied to said second wall surface irrespective of the condition of operation of said speed responsive means to cause said actuating means to close said valve.

2. A fuel control system for a gas turbine engine having a compressor and a combustor with a fuel nozzle, comprising:
   (a) means forming a body with a valve portion and an actuator portion, said valve portion having a bore with spaced fuel inlet and outlet ports, the inlet port being adapted for connection with a pressurized fuel source and the outlet port being adapted for connection with the fuel nozzle of the gas turbine;
   (b) valve means disposed in said bore for movement to control communication between said inlet and outlet ports;
   (c) means normally tending to move said valve toward a closed position;
   (d) valve actuating means in said actuator portion including a plunger and diaphragm assembly, said assembly having first and second opposed diaphragm surface areas and a predetermined reduced area diaphragm surface opposed to said first diaphragm surface area, the reduced area diaphragm surface being exposed to the valve outlet pressure;
   (e) means for applying differential pressures from the compressor outlet to said first and second diaphragm surface areas, the higher pressure being applied to said first surface area and tending to cause said actuating means to open said valve;
   (f) means responsive to the speed of the gas turbine engine to controllably vent and thus limit the pressure applied to said first diaphragm surface area; and
   (g) means responsive to a predetermined increase in turbine operating temperature to increase the pressure applied to said second diaphragm surface area irrespective of the condition of operation of said speed responsive means to cause said actuating means to close said valve.

3. A fuel control system for a gas turbine engine having a compressor and a combustor with a fuel nozzle, comprising:
   (a) means forming a body with a valve portion and an actuator portion, said valve portion having a bore with spaced fuel inlet and outlet ports, the inlet port being adapted for connection with a pressurized fuel source and the outlet being adapted for connection with the fuel nozzle of the gas turbine;
   (b) valve means disposed in said bore for movement to control communication between said inlet and outlet ports;
   (c) means normally tending to move said valve toward a closed position;
   (d) valve actuating means in said actuator portion including a plunger and diaphragm assembly, said assembly having first and second opposed diaphragm surface areas adapted to be exposed to differential pressures from the outlet of the compressor, the higher pressure being applied to the first diaphragm surface area and tending to cause said actuating means to open said valve;
   (e) means responsive to the speed of the gas turbine engine to controllably vent and thus limit the pressure applied to said first diaphragm surface area;
   (f) means responsive to a predetermined increase in turbine operating temperature to increase the pressure applied to said second diaphragm surface area irrespective of the condition of operation of said speed responsive means to cause said actuating means to close said valve; and
   (g) means for automatically varying the speed range over which said speed responsive pressure limiting means is operative.

4. A fuel control system for a gas turbine engine having a compressor and a combustor with a fuel nozzle, comprising:
   (a) means forming a body with a valve portion and an actuator portion, said valve portion having a bore with spaced fuel inlet and outlet ports, the inlet port being adapted for connection with a pressurized fuel source and the outlet being adapted for connection with the fuel nozzle of the gas turbine;
(b) means normally tending to move said valve toward a closed position;
(c) means for limiting the extent of movement of said valve in a closing direction to secure a minimum fuel flow;
(d) pressure responsive means operative when a predetermined compressor output pressure is reached to place said valve movement limiting means in a predetermined minimum fuel flow position;
(e) valve actuating means in said actuator portion including a plunger and a series of diaphragms secured thereto, said series of diaphragms providing first and second opposed surface areas;
(f) means for applying differential pressures from the compressor to said first and second opposed surface areas, the higher pressure being applied to said first surface area and tending to cause said actuating means to open said valve;
(g) means responsive to the speed of the gas turbine engine to limit the pressure applied to said first diaphragm surface area; and
(h) means for selectively varying the pressure applied to said second diaphragm surface area to change the speed range over which said speed responsive pressure limiting means is operative.

5. A fuel control system for a gas turbine engine having a compressor and a combustor with a fuel nozzle, comprising:
(a) means forming a body with a valve portion and an actuator portion, said valve portion having a bore with spaced fuel inlet and outlet ports, the inlet port being adapted for connection with a pressurized fuel source and the outlet being adapted for connection with the fuel nozzle of the gas turbine;
(b) means normally tending to move said valve toward a closed position;
(c) valve actuating means in said actuator portion including a plunger and a series of diaphragms secured thereto, said series of diaphragms providing first and second opposed surface areas;
(d) means for applying differential pressures from the compressor to said first and second opposed surface areas, the higher pressure being applied to said first surface area and tending to cause said actuating means to open said valve;
(e) means responsive to the speed of the gas turbine engine to controllably vent and thus limit the pressure applied to said first diaphragm surface area; and
(f) electrically actuated means operative independently of said speed responsive means for varying the pressures applied to said opposed diaphragm surface areas to control the speed of the gas turbine engine.

6. A fuel control system for a gas turbine engine having a compressor and a combustor with a fuel nozzle, comprising:
(a) means forming a body with a valve portion and an actuator portion, said valve portion having a bore with spaced fuel inlet and outlet ports, the inlet port being adapted for connection with a pressurized fuel source and the outlet being adapted for connection with the fuel nozzle of the gas turbine;
(b) means normally tending to move said valve toward a closed position;
(c) means responsive to the fuel pressure at the valve outlet to tend to close said valve;
(d) valve actuating means in said actuator portion including a plunger and a series of diaphragms secured thereto, said series of diaphragms providing first and second opposed surface areas;
(e) means for applying differential pressures from the compressor to said first and second opposed surface areas, the higher pressure being applied to said first surface area and tending to cause said actuating means to open said valve;
(f) means responsive to the speed of the gas turbine engine to controllably vent and thus limit the pressure applied to said first diaphragm surface; and
(g) means for selectively varying the pressure applied to said second diaphragm surface area to change the speed range over which said speed responsive pressure limiting means is operative.

7. A fuel control system for a gas turbine engine having a compressor and a combustor with a fuel nozzle, comprising:
(a) means forming a body with a valve portion and an actuator portion, said valve portion having a bore with spaced fuel inlet and outlet ports, the inlet port being adapted for connection with a pressurized fuel source and the outlet being adapted for connection with the fuel nozzle of the gas turbine;
(b) a valve spool disposed in said bore for movement to control communication between said inlet and outlet ports;
(c) adjustable resilient means normally tending to move said valve spool toward a closed position;
(d) actuating means in said actuating portion including a plunger and diaphragm assembly disposed to move said spool valve, said assembly having first and second diaphragms forming movable walls of first and second sets of pressure chambers, similar pressure changes in the chambers of each set having opposite effects on said assembly;
(e) restricted inlet means for admitting fluid under pressure to the chambers of each set, the least restriction being employed at the inlet to the first chamber of the first set, pressure in such chamber tending to cause said actuator to move said valve toward open position;
(f) means responsive to the speed of operation of the gas turbine engine to relieve the pressure in said first chamber; and
(g) means responsive to electrical signals to vary the pressure in at least one predetermined chamber of said sets of chambers to control the speed of the gas turbine engine.

8. A fuel control system for a gas turbine engine having a compressor and a combustor with a fuel nozzle, comprising:
(a) means forming a body with a valve portion and an actuator portion, said valve portion having a bore with spaced fuel inlet and outlet ports, the inlet port being adapted for connection with a pressurized fuel source and the outlet being adapted for connection with the fuel nozzle of the gas turbine;
(b) a valve spool disposed in said bore for movement to control communication between said inlet and outlet ports;
(c) adjustable resilient means normally tending to move said valve spool toward a closed position;
(d) means for limiting the extent of movement of said spool valve toward closed position to provide a minimum fuel flow for engine starting;
(e) means responsive to a predetermined compressor output pressure to place said spool valve movement limiting means in a predetermined minimum fuel flow position;
(f) actuating means in said actuating portion including a plunger and diaphragm assembly disposed to move said spool valve, said assembly having first and second diaphragms forming movable walls of first and second sets of pressure chambers, similar pressure changes in the chambers of each set having opposite effects on said assembly;
(g) restricted means for admitting fluid under pressure to an exhausting fluid from the chambers of each set to effect the operation of said actuating means;

(h) means selectively operable to vary the pressure relation in predetermined chambers to render said starting flow determining means operative;
(i) means responsive to the speed of operation of the gas turbine engine to vary the pressure relation in predetermined chambers to limit the speed of operation of the engine; and
(j) thermostatic means for varying the pressure relation in predetermined chambers to prevent overtemperature operation of the engine.

9. A fuel control system for a gas turbine engine having a compressor and a combustor with a fuel nozzle, comprising:
(a) means forming a body with a valve portion and an actuator portion, said valve portion having a bore with spaced fuel inlet and outlet ports, the inlet port being adapted for connection with a pressurized fuel source and the outlet being adapted for connection with the fuel nozzle of the gas turbine;
(b) a valve spool disposed in said bore for movement to control communication between said inlet and outlet ports;
(c) adjustable resilient means normally tending to move said valve spool toward a closed position;
(d) actuating means in said actuating portion including a plunger and diaphragm assembly disposed to move said spool valve, said assembly having first and second diaphragms forming movable walls of first and second sets of pressure chambers, similar pressure changes in the chambers of each set having opposite effects on said assembly;
(e) restricted inlet means for admitting fluid under pressure to the chambers of each set, the least restriction being employed at the inlet to the first chamber of the first set, pressure in such chamber tending to cause said actuator to move said valve toward open position;
(f) means responsive to the speed of operation of the gas turbine engine to relieve the pressure in said first chamber;
(g) means responsive to electrical signals to vary the pressure in at least one of said chambers to control the speed of the gas turbine engine, said means having a restricted nozzle means communicating with the chamber in which pressure is to be varied; and
(h) a torque motor with a movable element disposed adjacent said restricted nozzle means to control fluid flow therethrough in accordance with signals transmitted to the motor.

10. A fuel control system for a gas turbine engine having a compressor and a combustor with a fuel nozzle, comprising:
(a) means forming a body with a valve portion and an actuator portion, said valve portion having a bore with spaced fuel inlet and outlet ports, the inlet port being adapted for connection with a pressurized fuel source and the outlet being adapted for connection with the fuel nozzle of the gas turbine;
(b) a valve spool disposed in said bore for movement to control communication between said inlet and outlet ports;
(c) adjustable resilient means normally tending to move said valve spool toward a closed position;
(d) actuating means in said actuating portion including a plunger and diaphragm assembly disposed to move said spool valve, said assembly having first and second diaphragms forming movable walls of first and second sets of pressure chambers, similar pressure changes in the chambers of each set having opposite effects on said assembly;
(e) restricted inlet means for admitting fluid under pressure to the chambers of each set, the least restriction being employed at the inlet to the first chamber of the first set, pressure in such chamber tending to cause said actuator to move said valve toward open position;
(f) means responsive to the speed of operation of the gas turbine engine to relieve the pressure in said first chamber;
(g) means responsive to electrical signals to vary the pressure in two of said chambers to control the speed of the gas turbine engine, said means having a restricted nozzle communicating with each chamber in which pressure is to be varied, said nozzles being disposed in spaced opposed relation;
(h) means for adjusting said nozzles to vary the spacing therebetween; and
(i) a torque motor with an element disposed between said nozzles for movement alternately toward and away therefrom to control fluid flow through the nozzles in accordance with signals transmitted to the motor.

11. A fuel control system for a gas turbine engine having a compressor and a combustor with a fuel nozzle, comprising:
(a) means forming a body with a valve portion and an actuator portion, said valve portion having a bore with spaced fuel inlet and outlet ports, the inlet port being adapted for connection with a pressurized fuel source and the outlet being adapted for connection with the fuel nozzle of the gas turbine;
(b) valve means in said bore for controlling communication between said inlet and outlet ports;
(c) means normally tending to move said valve means toward a closed position;
(d) a first means engaging said valve means and responsive to fluid pressure from the compressor to move the valve means toward open position;
(e) a second means engaging said fluid pressure responsive means and operative when the latter is not exposed to fluid pressure to dispose said valve means in an engine starting position;
(f) a third means selectively operable to preclude the application of fluid pressure to said first means during the engine starting phase of operation;
(g) a fourth means disposed for movement between two positions and operative in each to engage said first means to limit movement of said valve means toward closed position to prevent combustor flameout, said fourth means being responsive to fluid pressure from the compressor to move to a predetermined one of said positions; and
(h) a fifth means responsive to the speed of the gas turbine engine after operation thereof has been initiated to limit the response of said first means to fluid pressure and control the actuation of said valve means thereby.

12. A fuel control system for a gas turbine engine having a compressor and a combustor with a fuel nozzle, comprising:
(a) means forming a body with a valve portion and an actuator portion, said valve portion having a bore with spaced fuel inlet and outlet ports, the inlet port being adapted for connection with a pressurized fuel source and the outlet being adapted for connection with the fuel nozzle of the gas turbine;
(b) valve means in said bore for controlling communication between said inlet and outlet ports;
(c) means normally tending to move said valve means toward a closed position;
(d) a first means having a pair of movable walls with opposed surfaces responsive to fluid pressure from the compressor to move the valve means toward open position;
(e) a second means engaging said first means and operative when the latter is not exposed to fluid pressure to dispose said valve means in an engine starting position;

(f) a third means selectively operable to preclude the application of fluid pressure to said first means during the engine starting phase of operation, said third means being rendered inoperative after engine operation has been initiated;
(g) a fourth means responsive to the speed of the gas turbine engine to bleed fluid pressure from one of said pair of movable walls to limit the response of said first means to fluid pressure and control the actuation of said valve means thereby; and
(h) a fifth means responsive to predetermined turbine exhaust temperature to apply fluid pressure to the other of said pair of movable walls to move said first means toward a valve closing position independently of the operation of said fourth means.

References Cited by the Examiner
UNITED STATES PATENTS

| | | | |
|---|---|---|---|
| 2,644,513 | 7/53 | Mock | 60—39.28 |
| 2,667,743 | 2/54 | Lee | 60—39.28 |
| 2,714,803 | 8/55 | Abild | 60—39.28 |
| 2,729,751 | 1/56 | Westman | 137—82 |
| 2,857,742 | 10/58 | Drake | 60—39.28 |
| 2,869,322 | 1/59 | Rankin | 60—39.28 |
| 3,040,529 | 6/62 | Hurtle | 60—39.28 |

FOREIGN PATENTS 848,560   9/60   Great Britain.

SAMUEL LEVINE, *Primary Examiner.* ns document body:

UNITED STATES PATENT OFFICE
CERTIFICATE OF CORRECTION

Patent No. 3,213,613                                                      October 26, 1965

Glennon V. Schwent et al.

It is hereby certified that error appears in the above numbered patent requiring correction and that the said Letters Patent should read as corrected below.

Column 2, line 53, for "25,120" read -- 25,210 --.

Signed and sealed this 20th day of September 1966.

(SEAL)
Attest:

ERNEST W. SWIDER                                            EDWARD J. BRENNER
Attesting Officer                                                   Commissioner of Patents